United States Patent
Kawai

(10) Patent No.: US 7,760,398 B2
(45) Date of Patent: Jul. 20, 2010

(54) COLOR CONVERSION TABLE GENERATION METHOD AND COLOR CONVERSION TABLE GENERATION DEVICE

(75) Inventor: Yoshinori Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 11/778,893

(22) Filed: Jul. 17, 2007

(65) Prior Publication Data

US 2008/0018962 A1 Jan. 24, 2008

(30) Foreign Application Priority Data

Jul. 20, 2006 (JP) ............... 2006-198706

(51) Int. Cl.
*H04N 1/60* (2006.01)
*G03F 3/08* (2006.01)
*G06K 9/00* (2006.01)

(52) U.S. Cl. .................. 358/1.9; 358/518; 382/167
(58) Field of Classification Search ............. None
See application file for complete search history.

(56) References Cited

U.S. PATENT DOCUMENTS 6,023,351 A   2/2000   Newman .................. 358/524
7,586,644 B2 *  9/2009  Walton et al. ............. 358/1.9
7,652,806 B2 *  1/2010  Schweid et al. ........... 358/518
2001/0043358 A1 * 11/2001 Schwartz ................ 358/1.15
2004/0234127 A1 * 11/2004 Arai et al. ................ 382/167
2006/0028665 A1 *  2/2006  Kawai .................... 358/1.9

FOREIGN PATENT DOCUMENTS

| JP | 09-009080 | 1/1997 |
| JP | 2002-064719 | 2/2002 |
| JP | 2003-348365 | 12/2003 |

\* cited by examiner

*Primary Examiner*—Twyler L Haskins
*Assistant Examiner*—Barbara D Reinier
(74) *Attorney, Agent, or Firm*—Fitzpatrick, Cella, Harper & Scinto

(57) ABSTRACT

A color conversion table is generated by estimating a device color corresponding to the color of a grid point forming the color conversion table from a calorimetric value obtained by calorimetrically measuring a color of a gamut reproduced by an output device. In addition to the color of the grid point forming the color conversion table, a device color corresponding to a color other than that of the grid point is estimated. The generated color conversion table is corrected using the estimated device color corresponding to the color of the grid point and the estimated device color corresponding to the color other than that of the grid point.

12 Claims, 14 Drawing Sheets

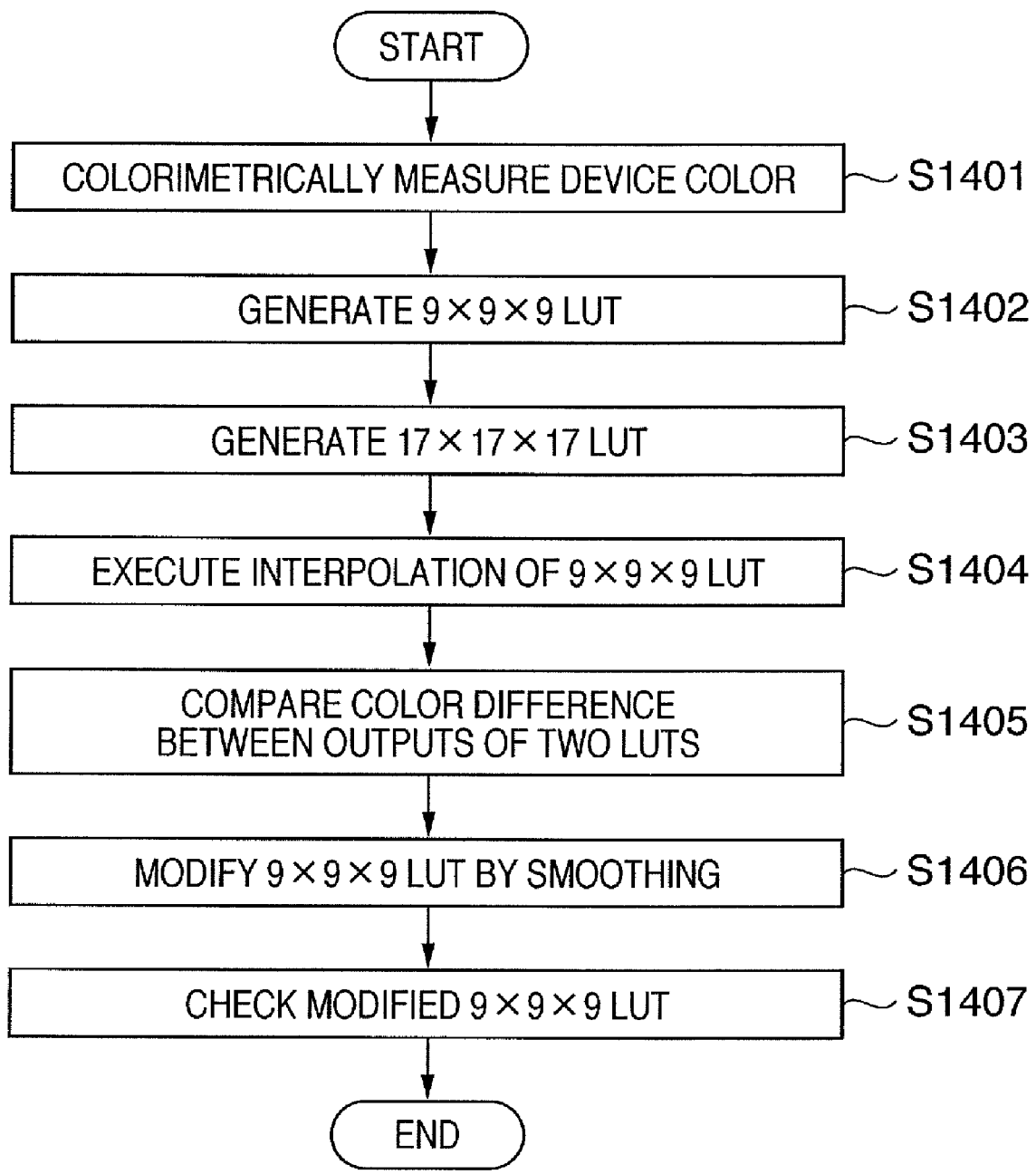

COLOR CONVERSION TABLE GENERATION METHOD AND COLOR CONVERSION TABLE GENERATION DEVICE

BACKGROUND OF THE INVENTION

1. Field of the Invention

The present invention relates to a technique of generating a color conversion table for converting color image data into a color (device color) in the gamut of an output device.

2. Description of the Related Art

When using an image output device such as a printer, a color space (e.g., RGB color space) of an image input device or input image or a device-independent color space (Lab/XYZ color space or the like) is color-converted to a color space (e.g., CMYK color space or RGB color space) of the image output device. With this color conversion, input color signals are converted into output color signals of the color space of the image output device, and are output from an image output unit as a color image.

Conventionally, color conversion from the color space of an input device to that of an output device is implemented, for example, by matrix conversion. However, in order to improve accuracy, a three-dimensional (3D) look-up table (LUT) has been used in recent years.

A general generation method of an LUT for color-converting the color space of an input device or a device-independent color space to that of an output device is as follows.

First, for an input color of a grid point forming an LUT, a color included in the gamut of an output device is determined as a corresponding color. A color (device color: e.g., CMYK color or RGB color) which is closest to the corresponding color is searched for in the color space of the output device, and the located device color is set as an output color for the grid point. When output colors corresponding to the input colors of all grid points have been obtained, the LUT is complete.

Note that a closest device color is generally searched for in a uniform color space (Lab color space, Luv color space, or the like).

In color conversion using an LUT, only the output values corresponding to the input values of the grid points are provided as the LUT. Accordingly, output values corresponding to input values other than those of the grid points are calculated by interpolation. As an interpolation method, linear interpolation such as cubic interpolation or tetrahedron interpolation or nonlinear interpolation such as spline interpolation is available.

From the viewpoint of conversion accuracy, ideal color conversion is obtained by determining corresponding colors of all input colors by using colors included in the gamut of an output device, searching for device colors closest to the respective corresponding colors, and setting the located device colors as output values. However, this method is not practical because it requires a process for determining corresponding colors for all input colors, which requires a huge amount of calculation. Therefore, color conversion using an LUT is executed as a practical method.

In color conversion using an LUT, since only the output values corresponding to the grid points are provided as the LUT, the output values are ensured. However, since output values corresponding to input values other than those of the grid points are calculated by interpolation, output values other than those of the grid points differ between matrix conversion and LUT conversion. Therefore, the accuracy of certain colors may be lower in the case of color conversion using an LUT.

As a general generation method of an LUT, a device color corresponding to an input value of a grid point forming the LUT is obtained and set as an output value (e.g., patent reference 1: Japanese Patent Laid-Open No. 2002-064719). When performing color conversion using an LUT, although the accuracy of output values other than those of the grid points is low, output values corresponding to input values other than those of the grid points are not considered in the first place when generating the LUT. The accuracy can be improved by increasing the number of grid points of the LUT, however, it cannot be excessively increased because there are constrains as to a memory capacity or the like when attaching an LUT to an output or control device.

A method of correcting an LUT to improve its accuracy when generating an LUT is also available (e.g., patent reference 2: Japanese Patent Laid-Open No. 2003-348365). This method generates an LUT, calculates an output value of the midpoint between grid points of the LUT by interpolation, and corrects the LUT using the difference between the output value of the grid point and that of the midpoint between grid points.

Such LUT correction aims to improve the tonality of an output result by the LUT. However, while the tonality improves, the output values deviate from the colors to be output.

A method of correcting an LUT by considering output values corresponding to input values other than those of the grid points of the LUT is also available (e.g., patent reference 3: Japanese Patent Laid-Open No. 09-009080).

However, the purpose of this method is to correct output deviations caused by errors produced when estimating a device color from a calorimetric value, and the method requires the output result of a calorimetric measurement of a printout from an output device which uses a generated LUT. Colorimetric measurement takes time, and it is wasteful to perform calorimetric measurement only in order to correct theoretical errors that occur upon interpolation of an LUT.

SUMMARY OF THE INVENTION

It is an object of the present invention to improve the accuracy of a color conversion table without increasing the number of grid points of the color conversion table and without executing calorimetric measurement after the color conversion table is generated.

According to an embodiment of the present invention, there is provided a color conversion table generation method comprising: generating a color conversion table by estimating a device color corresponding to a color of a grid point in a set of grid points forming a color conversion table from a calorimetric value obtained by calorimetrically measuring a color of a gamut reproduced by an output device; estimating, in addition to a color of a grid point of a set of grid points which forms the color conversion table, a device color corresponding to a color other than the color of the grid point; and correcting the color conversion table by using the estimated device color corresponding to the color of the grid point and the estimated device color corresponding to the color other than the color of the grid point.

According to an embodiment of the present invention, there is provided a color conversion table generation device comprising: a generation unit adapted to generate a color conversion table by estimating a device color corresponding to a color of a grid point in a set of grid points forming a color conversion table from a calorimetric value obtained by calorimetrically measuring a color of a gamut reproduced by an output device; an estimation unit adapted to estimate, in addition to a color of a grid point of a set of grid points which forms the color conversion table, a device color corresponding to a color other than the color of the grid point; and a correction unit adapted to correct the color conversion table by using the estimated device color corresponding to the color of the grid point and the estimated device color corresponding to the color other than the color of the grid point.

Further features of the present invention will become apparent from the following description of exemplary embodiments with reference to the attached drawings.

BRIEF DESCRIPTION OF THE DRAWINGS

FIG. 14 is a flowchart illustrating the LUT generation and modification process according to the third embodiment.

DESCRIPTION OF THE EMBODIMENTS

Preferred embodiments to realize the invention will be described in detail with reference to the accompanying drawings.

Figure 1:
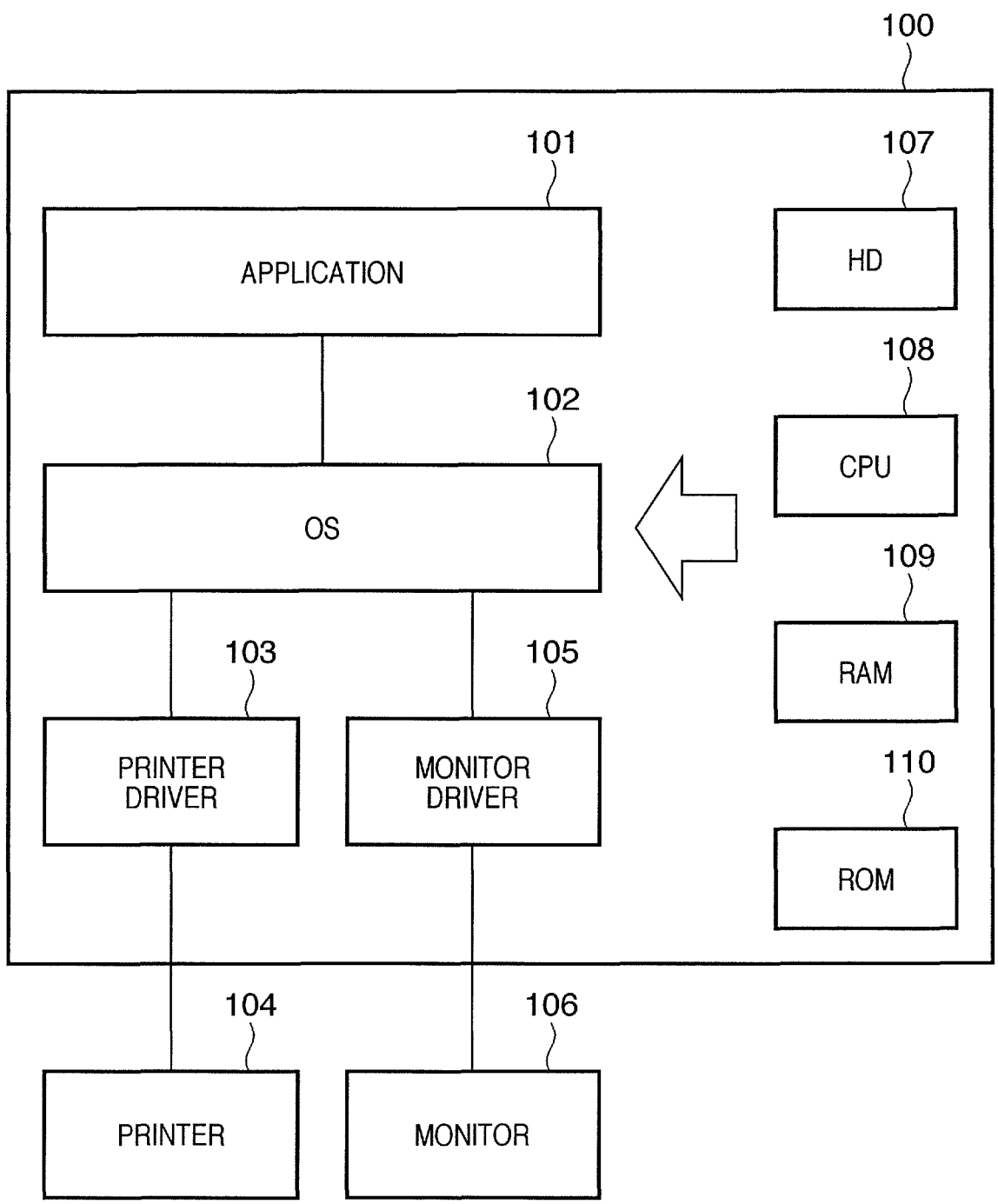
FIG. 1 is a block diagram schematically depicting the arrangement of a host computer in a printing system.

FIG. 1 is a block diagram schematically depicting the arrangement of a host computer in a printing system. As shown in FIG. 1, a host computer 100 includes an application 101 such as a word processor, spreadsheet, browser, and the like, an operating system (OS) 102, a printer driver 103, and a monitor driver 105 as software. The printer driver 103 executes rendering processing of a variety of rendering instructions issued from the application 101 to the OS 102 to generate print data to be output to a printer 104. Rendering instructions include an image rendering instruction, text rendering instruction, graphics rendering instruction, and the like. The monitor driver 105 generates image data to be displayed on a monitor 106.

The host computer 100 also comprises a hard disk (HD) 107, CPU 108, RAM 109, RON 110, and the like as hardware for operating the above-described software.

Note that in this embodiment, an arbitrary application having a printing function is installed as the application 101, and Windows (registered trademark) is installed as the OS 102.

The printer 104 is, for example, an inkjet printer. A CRT, LCD, or the like can be used as the monitor 106.

In the above-described arrangement, the application 101 of the host computer 100 generates output image data to be printed based on an image displayed in a window which is displayed on the monitor 106. At this time, the displayed image is classified into text data such as a text string, graphics data such as a graphic, and image data such as a photo image. Text data is formed as a text rendering instruction, graphics data is formed as a graphics rendering instruction, and image data is formed as an image rendering instruction. These rendering instructions are issued to the OS 102 as a print request.

Moreover, when the OS 102 receives a print request, it passes rendering instructions to the printer driver 103 which corresponds to a printer to be printed to. The printer driver 103 processes rendering instructions input from the OS 102, generates print data printable by the printer 104, and transmits the print data to the printer 104.

When the printer 104 is a raster printer, the printer driver 103 sequentially performs an image correction process for rendering instructions to sequentially rasterize an image on a 24-bit RGB page memory. After all the rendering instructions are rasterized, the printer driver 103 converts the RGB data stored in the page memory into a data format printable by the printer 104—for example, CMYK data—and transmits the CMYK data to the printer 104.

Figure 2:
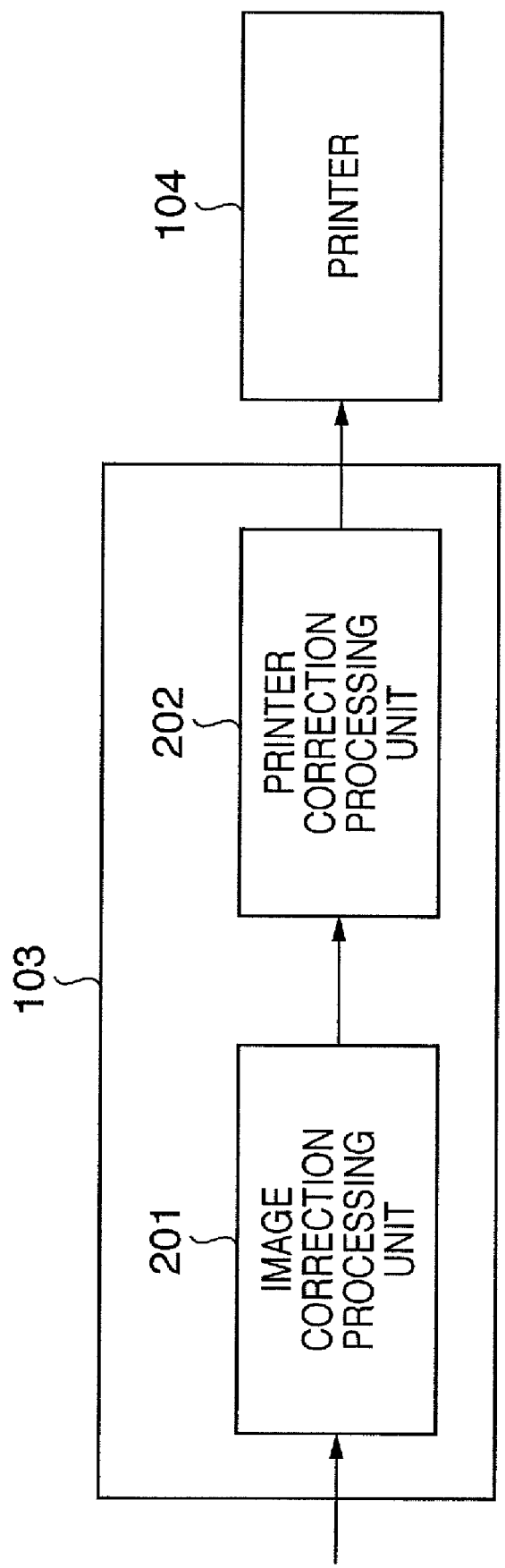
FIG. 2 is a view illustrating a process executed in a printer driver 103 shown in FIG. 1.

FIG. 2 is a view illustrating a process executed by the printer driver 103 shown in FIG. 1. An image correction processing unit 201 shown in FIG. 2 performs an image correction process for color information included in rendering instructions input from the OS 102. For example, the image correction processing unit 201 converts color information of a color space (e.g., sRGB) of an input device into a luminance/color difference signal, and performs an exposure correction process on the luminance signal. After that, the corrected luminance/color difference signal undergoes inverse conversion to RGB color information of the color space of the input device.

A printer correction processing unit 202 refers to RGB color information of the color space of the input device, which underwent an image correction process, rasterizes an image based on a rendering instruction, and generates a raster image in the page memory. The printer correction processing unit 202 then performs processes such as first-stage color signal conversion (color conversion from the color space of the input device to that of the output device), second-stage color signal conversion (color separation to CMYK), tone correction, and the like, on the raster image to generate CMYK data which determines the color reproducibility of the printer 104 for each pixel.

Note that although respective processing units have been described as being executed by the printer driver 103, the image correction processing unit 201, printer correction processing unit 202, and the like may be executed in the application 101.

Figure 3:
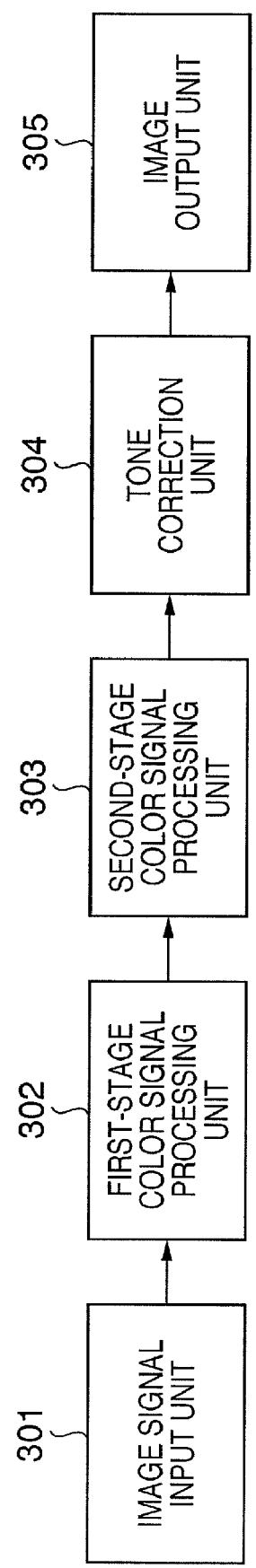
FIG. 3 is a view illustrating the detailed process of a printer correction processing unit 202 shown in FIG. 2.

FIG. 3 is a view illustrating the detailed process of the printer correction processing unit 202 shown in FIG. 2. An image signal, which underwent an image correction process, is input to an image signal input unit 301 shown in FIG. 3. The image signal undergoes input color matching by a first-stage color signal processing unit 302, and then undergoes color separation by a color signal processing unit 303 in consideration of inkjet printer characteristics. The image data then undergoes tone correction and halftoning by a tone correction unit 304, and is transmitted from an image output unit 305 to the printer 104 as dot information of CMYK c (light cyan) m (light magenta) corresponding to respective inks. In this manner, an image is generated.

Note that this embodiment assumes, as the printer 104, an inkjet printer which uses inks of six colors including CMYK as darkly colored inks and cm as lightly colored inks.

In an inkjet printer, color separation needs to be performed in consideration of the graininess of printed dots and the total amount of ink droplets receivable by a printing medium per unit time and unit area.

For this reason, a second-stage color processing table for color-separating RGB data in consideration of the above-described requirements and outputting an appropriate combination of CMYKcm inks is set in the second-stage color signal processing unit 303 in advance. When color processing for a printer is operated via this second-stage color processing table, the printer can be treated as an RGB device which simply processes RGB data irrespective of the color model of the printer—for example, whether it uses the four colors of CMYK or six colors of CMYKcm. RGB data in this case is called a second-stage color space RGB (second-stage RGB).

The first-stage color signal processing unit 302 also includes a first-stage color processing table (first-stage table) which is a 3D LUT for color-inputting a color space (e.g., sRGB) of an image input device and a color space (e.g., second-stage RGB) of an output device. In order to support a plurality of color reproducibilities, this first-stage table includes tables supports color reproducibility with priority given to tonality, saturation, calorimetric matching, and memorized colors. In addition to these tables, in order to support color spaces of other input devices, the first-stage color signal processing unit 302 can comprise first-stage tables supporting those color spaces.

[LUT Generation]

A generation method of a look-up table (LUT) for color-converting a color space (sRGB, Adobe RGB, or the like) of an input device to that of an output device will be described. In this embodiment, an sRGB color space is used as the color space of an input device.

To generate an LUT is to determine, as an output, a device color for each point in the grid forming the LUT. First, an input color of a grid point forming the LUT is determined. A color included in the gamut of an output device is determined as a corresponding color for the input color of the grid point forming the LUT. A device color of the output device closest to the corresponding color is searched for. The located device color is set as an output value of the grid point. In this manner, the LUT is generated. This process is generally executed in a uniform color space (Lab color space, Luv color space, or the like). In this embodiment, the Lab color space is used to describe the method.

First, an input color for each grid point forming an LUT is determined. When an LUT from a color space of an input device to that of an output device is to be generated, a color (sRGB color space) of the input device is converted into a color of a uniform color space (Lab color space) based on formulas, and the converted color is set as an input color. Color conversion may be performed in consideration of user preference or memorized colors, and the color-converted value may be set as an input color. As a color conversion method supporting user preference or memorized colors can be implemented by executing nonlinear conversion in an RGB color space or changing brightness, luminance, hue, saturation, or the like.

Next, a color included in the gamut of an output device is determined as a corresponding color for the input color of each of the grid points forming the LUT. Upon determining the corresponding colors, since the color reproduction range of the input device is different from that of the output device, some input colors fall outside the gamut of the output device. Accordingly, the input colors outside the gamut of the output device must be compressed in order to map them within the gamut of the output device.

More specifically, assume a line which connects a given point within the gamut of the output device and the input color. The input color is compressed along the line toward the gamut, and an intersection point with the boundary of the gamut or a point within the gamut is determined as a corresponding color which corresponds to the input color (color reproducibility with priority given to colorimetric matching). As this compression method, an algorithm corresponding to the color reproducibility of an LUT to be generated may be used. For example, a color may be compressed while keeping the brightness or saturation unchanged (color reproducibility with priority given to brightness and that with priority given to saturation). A color may be also compressed not onto the boundary in consideration of the tonality but within the gamut of the output device in accordance with the saturation or the like of the input color (color reproducibility with priority given to tonality).

A device color of the output device which is closest to the corresponding color is searched for, and the located device color is set as an output value for the grid point. In this manner, the LUT is generated.

In an inkjet printer, however, it is difficult to predict color development characteristics because a variety of complicated factors are associated with color development, such as changes in color development caused by ink color mixing changes in color development caused by differences in the manner of ink penetration into a printing medium, and the like.

In order to express the color reproducibility and gamut of an inkjet printer while avoiding the difficulty in predicting color development, an Lab value corresponding to a given specific color is obtained using the following method. That is, available device colors of an output device are combined and color patches are printed at appropriate sampling intervals. These color patches are measured by a calorimeter, for instance, Spectrolino manufactured by Gretag Co.

By this process, grid point data of an LUT from a device color to an Lab value can be obtained. In this embodiment, 9×9×9=729 color patches are output corresponding to the number of grid points forming the LUT from a device color to an Lab value, and are colorimetrically measured. An Lab value corresponding to a given device color can be estimated from the Lab value of a grid point by using known interpolation such as tetrahedron interpolation to the obtained LUT from a device color to an Lab value. The respective input colors corresponding to the grid points forming the obtained LUT are compared with the estimated calorimetric Lab values corresponding to the device colors, and an approximate point which can minimize their respective color differences is searched for. With this process, the value of the device color as the corresponding color of a grid point can be obtained. The same processing is performed for all the grid points forming the LUT to generate the LUT. When the number of grid points of color patches to be used increases (e.g., 12×12×12, or 17×17×17=4913), or when the number of patches in a portion with low estimation accuracy increases, the device color estimation accuracy improves.

[Color Conversion Using LUT and a Related Problem]

As described above, in color conversions using an LUT, only output values corresponding to grid points are provided. Accordingly, output values corresponding to input values other than those of the grid points are obtained by using interpolation. As an interpolation method, linear interpolation such as cubic interpolation or tetrahedron interpolation, or nonlinear interpolation such as spline interpolation is used.

Color conversion using an LUT generated by cubic interpolation will be described below in detail, although other linear interpolation methods such as tetrahedron interpolation or nonlinear interpolation method can be executed in the same manner.

A 3D input and n-dimensional output LUT is used for color conversion. In order to clarify the processing method, a two-dimensional (2D) input and 3D output interpolation process will be described as an example. Note that the 2D input is used to simplify the drawings and aid in understand the description.

Figure 4:
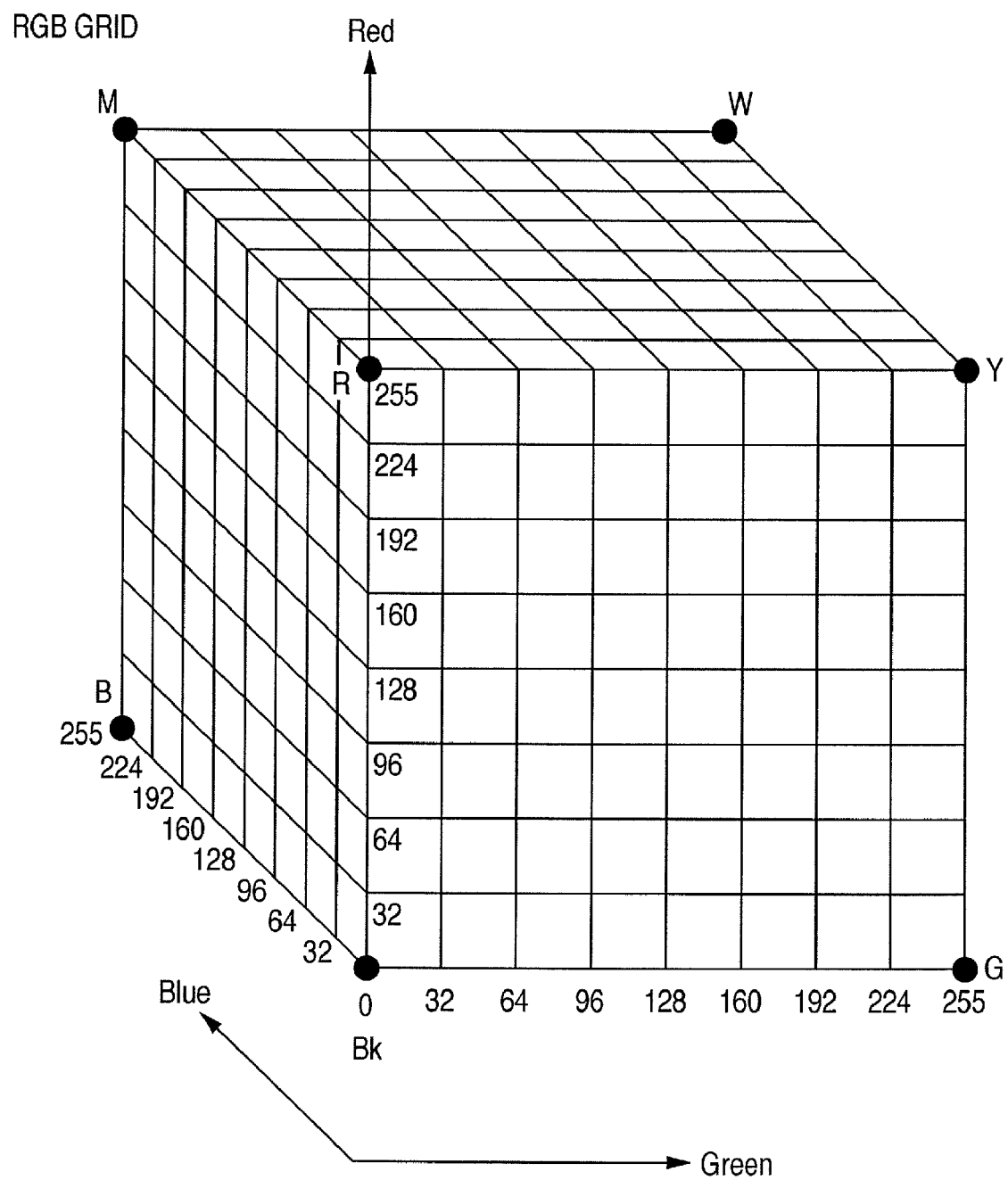
FIG. 4 is a view for explaining the concept of a 3D input LUT.

FIG. 4 is a view for explaining the concept of a 3D input LUT. FIG. 4 shows a diagram which illustrates an sRGB color space using an RGB calorimetric system. As shown in FIG. 4, nine grid points are plotted along each of the R axis, G axis, and B axis at uniform intervals. Each point of black (Bk), red (R), green (G), blue (B), magenta (M), yellow (Y), and white (W) is shown.

Note that the point of cyan (C) is located directly below the point of white (W). An axis from the Bk point to the B point is called a blue axis; an axis from the Bk point to the G point, a green axis; and an axis from the Bk point to the R point, a red axis. Values of 0, 32, 64, 96, 128, 160, 192, 224, and 255 are assigned to input values in the input color space. Output values are assigned in an output color space.

Figure 5:
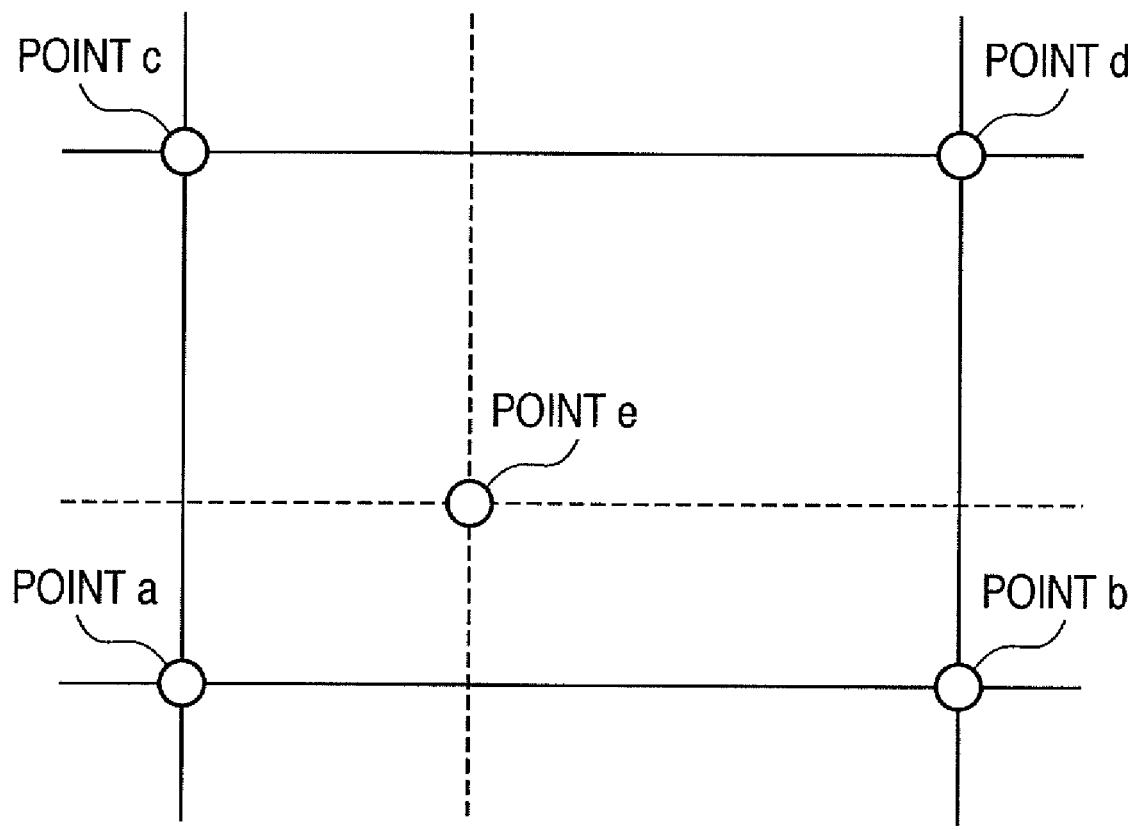
FIG. 5 is a view showing a part of the LUT shown in FIG. 4 in an input space.
Figure 6:
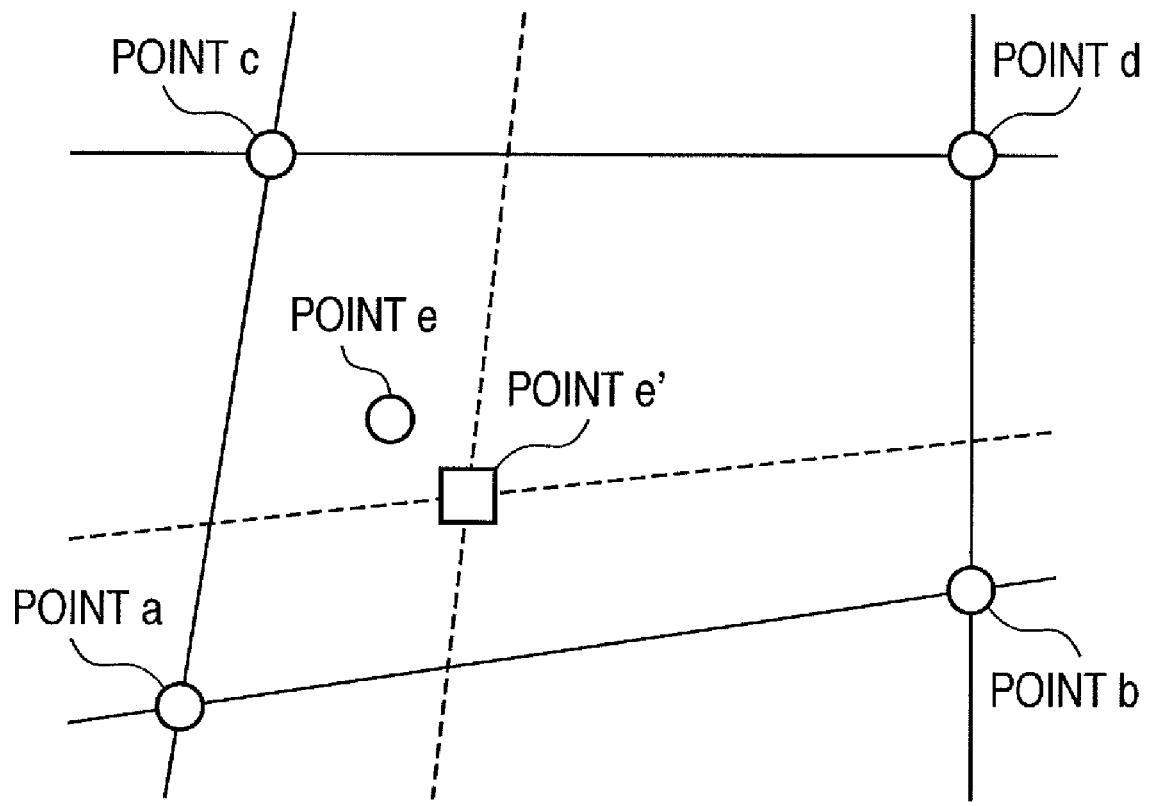
FIG. 6 is a view showing the part of the LUT shown in FIG. 4 in an output space.

FIGS. 5 and 6 respectively show a portion of the LUT shown in FIG. 4. FIG. 5 shows the LUT by using the input color space, and FIG. 6 shows the LUT by using the output color space. In FIGS. 5 and 6, points a through d correspond to the grid points which form the generated LUT. Input values corresponding to the respective grid points are expressed by A (RSrc_a, GSrc_a, BSrc_a), B (RSrc_b, GSrc_b, BSrc_b), C (RSrc_c, GSrc_c, BSrc_c), and D (RSrc_d, GSrc_d, BSrc_d). Since a 2D input is assumed, all B components have the same value. Output values are expressed by a (RDst_a, GDst_a, BDst_a), b (RDst_b, GDst_b, BDst_b), c (RDst_c, GDst_c, BDst_c), and d (RDst_d, GDst_d, BDst_d). The output values are determined based on the above-described LUT generation method.

An input value E (RSrc_e, GSrc_e, BSrc_e) will be considered. An output value E' (R'Dst_e, G'Dst_e, B'Dst_e) for this input value is calculated by cubic interpolation using:

$$R'Dst\_e = ((RSrc\_e - RSrc\_a) * (GSrc\_e - DSrc\_a) * RDst\_d +$$
$$(RSrc\_b - RSrc\_e) * (-GSrc\_e - GSrc\_a) * RDst\_c +$$
$$(RSrc\_e - RSrc\_c) * (GSrc\_a - GSrc\_e) * RDst\_b +$$
$$(RSrc\_d - RSrc\_e) * (GSrc\_d - GSrc\_e) * RDst\_a) /$$
$$(RSrc\_d - RSrc\_a) * (GSrc\_d - GSrc\_a)) G'Dst\_e =$$
$$((RSrc\_e - RSrc\_a) * (GSrc\_e - GSrc\_a) * GDst\_d +$$
$$(RSrc\_b - RSrc\_e) * (-GSrc\_e - GSrc\_a) * GDst\_c +$$
$$(RSrc\_e - RSrc\_c) * (GSrc\_a - GSrc\_e) * GDst\_b +$$
$$(RSrc\_d - RSrc\_e) * (GSrc\_d - GSrc\_e) * GDst\_a) /$$
$$(RSrc\_d - RSrc\_a) * (GSrc\_d - GSrc\_a)) B'Dst\_e =$$
$$((RSrc\_e - RSrc\_a) * (GSrc\_e - GSrc\_a) * BDst\_d +$$
$$(RSrc\_b - RSrc\_e) * (-GSrc\_e - GSrc\_a) * BDst\_c +$$
$$(RSrc\_e - RSrc\_c) * (GSrc\_a - GSrc\_e) * BDst\_b +$$
$$(RSrc\_d - RSrc\_e) * (GSrc\_d - GSrc\_e) * BDst\_a) /$$
$$(RSrc\_d - RSrc\_a) * (GSrc\_d - GSrc\_a))$$

When the above-described calculation is performed for all the input values, color conversion using the LUT is executed.

For the sake of simplicity, a 2D input is described. However, the same method can be applied to a 3D input.

A device color corresponding to the input value E (RSrc_e, GSrc_e, BSrc_e) is directly obtained by the method used in generating the LUT. The obtained output value is expressed by E (RDst_e, GDst_e, BDst_e). This is the output value that was sought, and thus when the estimation accuracy is high, the desired color is output from a printer by outputting this output value. This output value is directly calculated in a uniform color space by using the colorimetric value of the output device, and may be different from the output E' obtained by interpolation using the generated BUT. That is, as shown in FIG. 6, deviation between the point e' obtained by interpolation and the point e which was supposed to be obtained presents a problem associated with the interpolation method using an LUT.

A deviation occurs because, in color conversion using an LUT, an output value is obtained by applying a relationship between the grid points in the input color space of the LUT to the output color space as the output value. Since linearity does not always hold in an output color space, a deviation occurs in portions with low linearity.

As a portion wherein the deviation is large, a portion wherein the distance between grid points is large or a portion wherein the linearity of a device color and an Lab value of its output value is low can be assumed.

An example motivated by the above-described problem will be described. Generally, as the number of grid points increases, the accuracy of LUT conversion improves. Color conversions using an LUT with 9×9×9=729 grid points and an LUT with 17×17×17=4913 grid points will be described in detail with reference to FIGS. 7 to 9.

Figure 7:
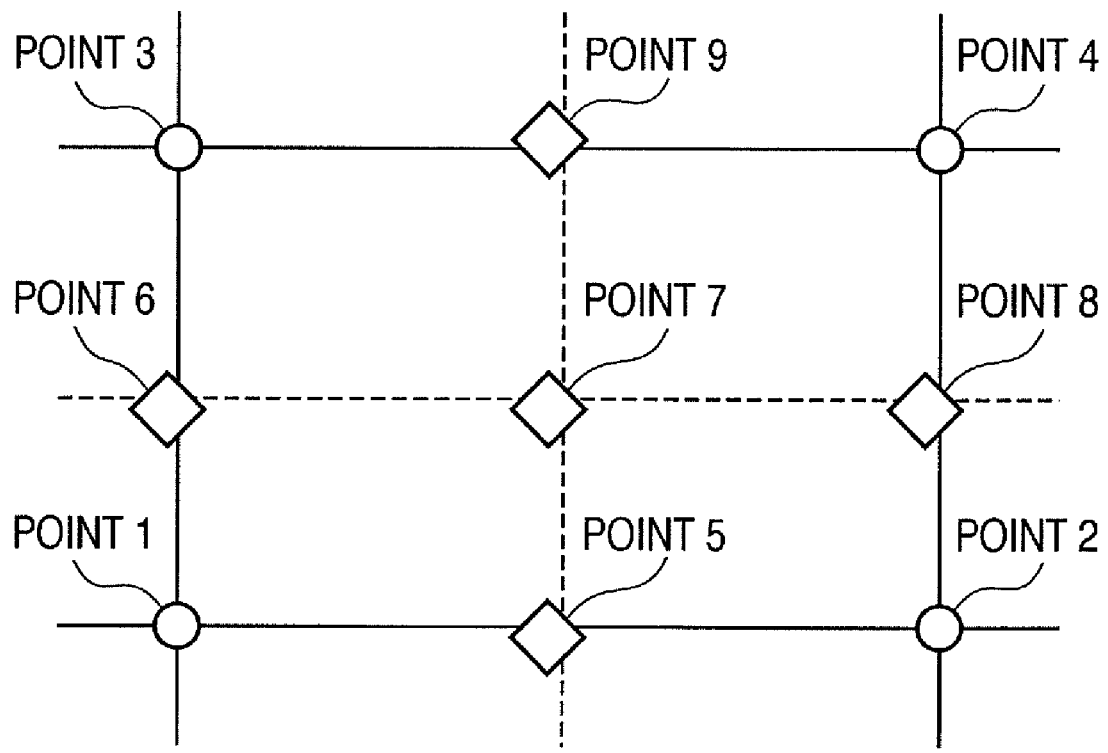
FIG. 7 is a view illustrating the relationship of grid points between a 9×9×9(=729) LUT and a 17×17×17(=4913) LUT.
Figure 8:
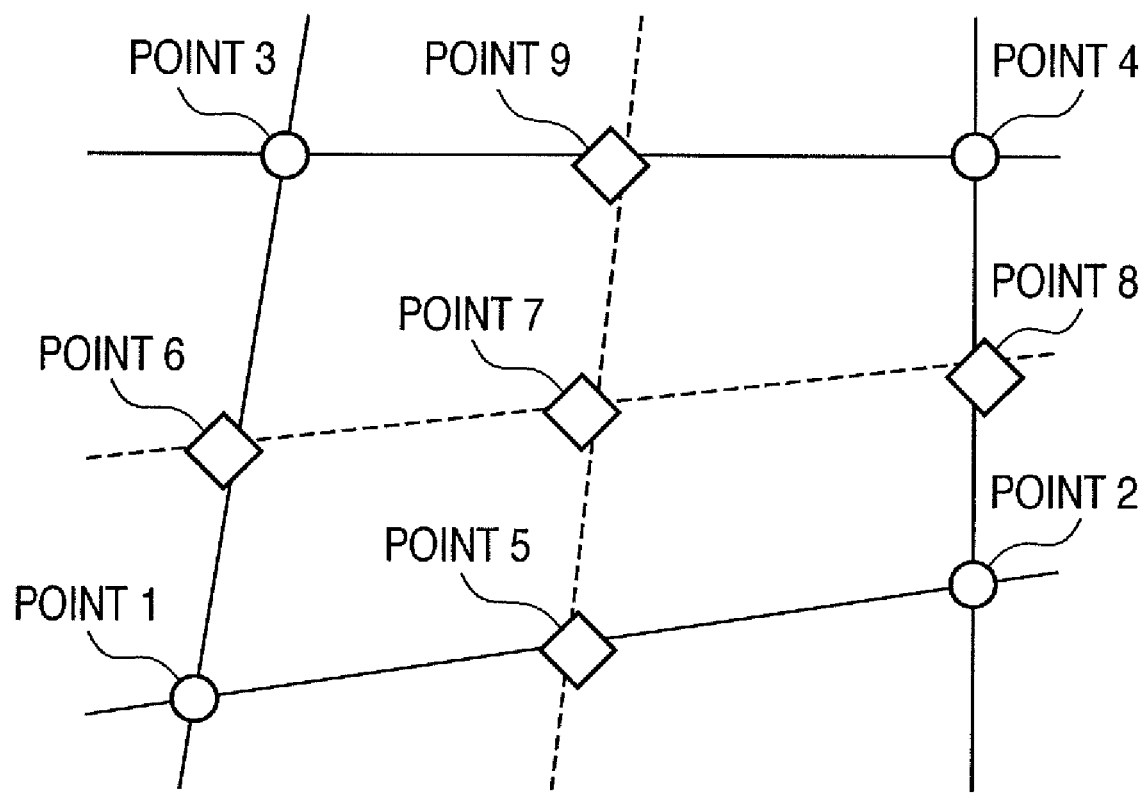
FIG. 8 is a view showing the grid points of the 9×9×9 (=729) LUT.
Figure 9:
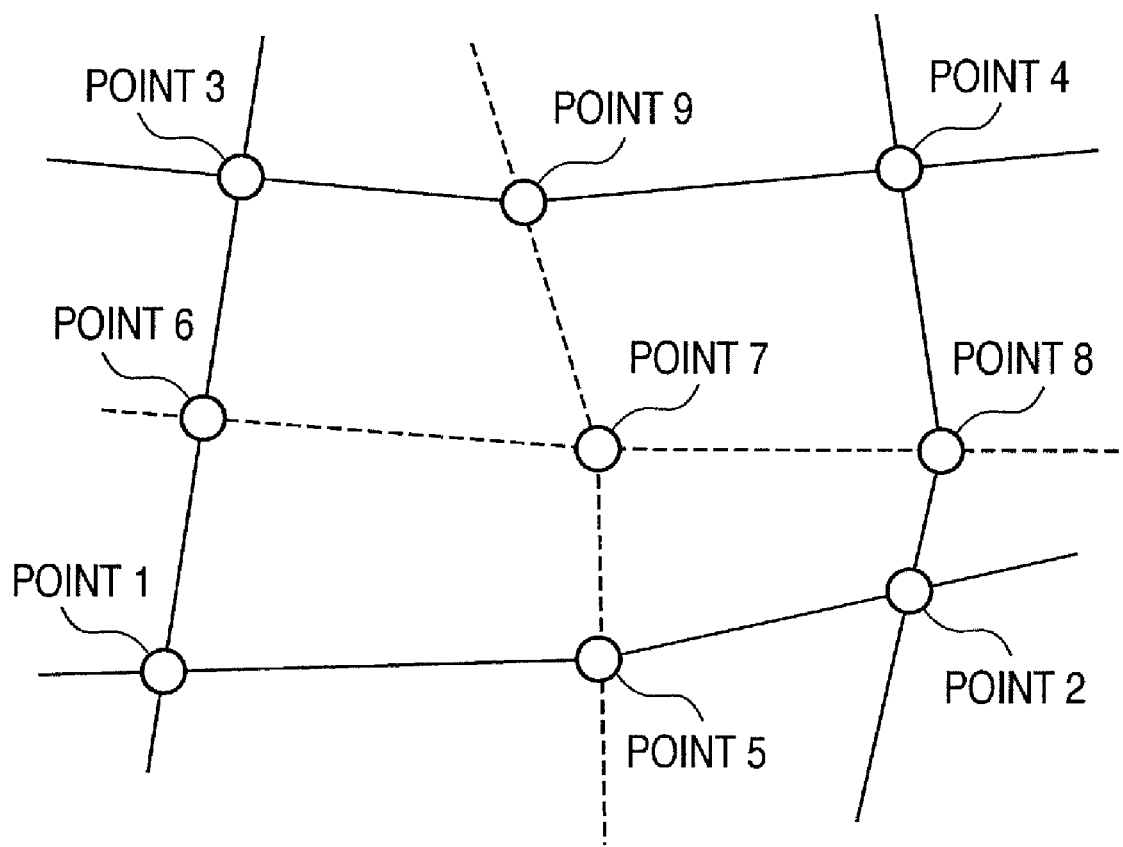
FIG. 9 is a view showing the grid points of the 17×17×17 (=4913) LUT.

FIG. 7 is a view illustrating the relationship of grid points between a 9×9×9(=729) LUT and a 17×17×17(=4913) LUT. FIG. 8 is a view showing the grid points of the 9×9×9(=729) LUT. FIG. 9 is a view showing the grid points of the 17×17×17(=4913) LUT.

Output values of the grid points forming the respective LUTs are calculated using calorimetric values of an identical output device by the above-described LUT generation method. Points 1 through 4 are grid points included in both the 9×9×9 LUT and 17×17×17 LUT. Points 5 through 9 are grid points included only in the 17×17×17 LUT. Outputs of points 1 through 9 are calculated by interpolation respectively using the 9×9×9 LUT and 17×17×17 LUT.

Since points 1 through 4 are grid points of the respective LUTs, output values corresponding to points 1 through 4 are the same in the 9×9×9 LUT (FIG. 8) and the 17×17×17 LUT (FIG. 9). However, since points 5 through 9 are grid points not included in the 9×9×9 LUT, output values corresponding to points 5 through 9 are calculated by interpolation in the case of the 9×9×9 LUT. For this reason, output values of the 9×9×9 LUT (FIG. 8) may be different from those of the 17×17×17 LUT (FIG. 9).

Output results of color conversion using the 9×9×9 LUT are now compared with those of color conversion using the 17×17×17 LUT. In the vicinity of a grid point of the 9×9×9

Figure 10:
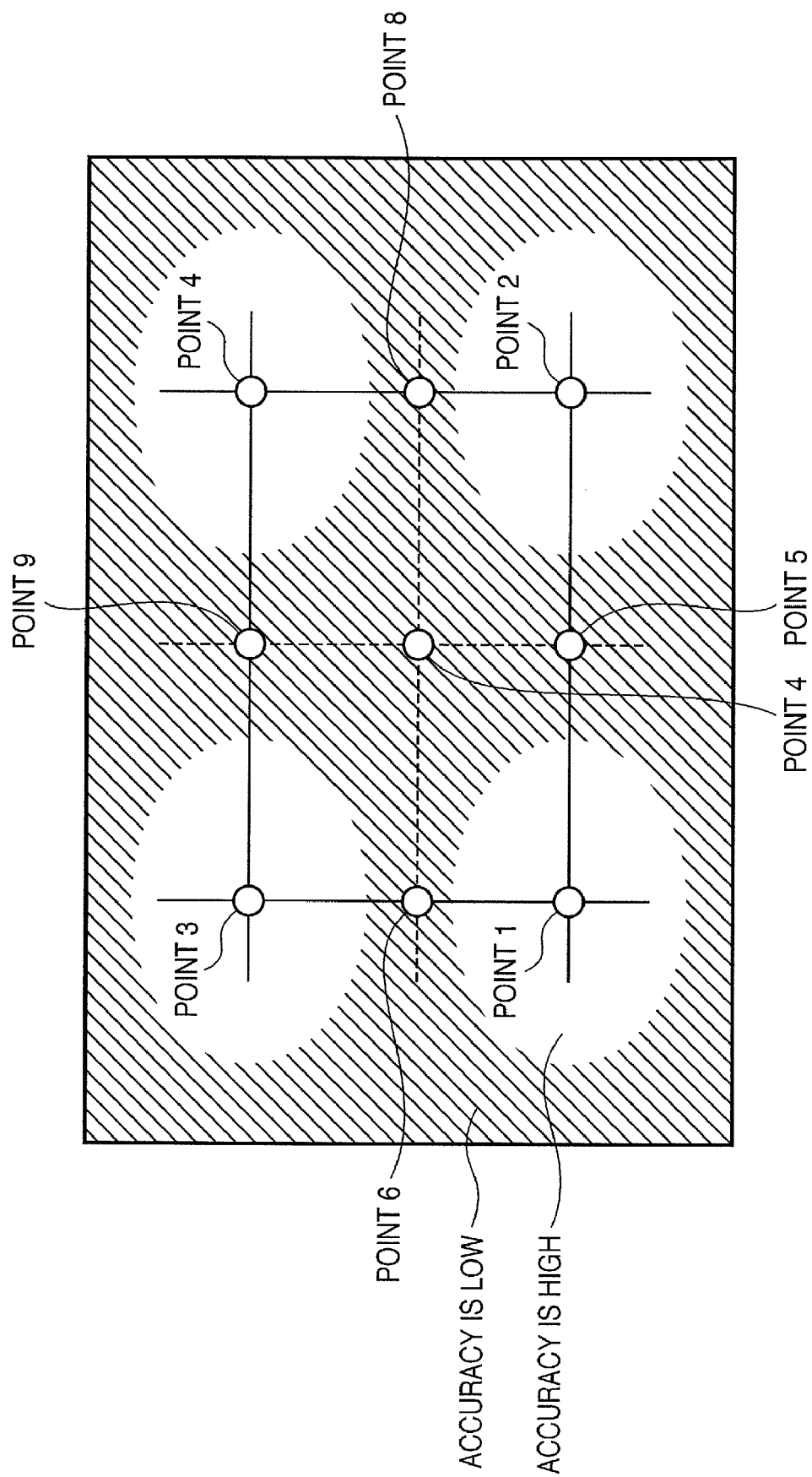
FIG. 10 is a view showing interpolation results of LUTs with different grid point counts.

LUT, the interpolation result is not largely different from that of the 17×17×17 LUT. However, in a portion distant from the grid point of the 9×9×9 LUT, the interpolation result may be different from that of the 17×17×17 LUT. This relationship is shown in FIG. 10.

In the vicinity of a grid point, accuracy is the same irrespective of the number of grid points. In a portion apart from a grid point, however, accuracy varies in accordance with the number of grid points because of the interpolation. More specifically, as the number of grid points increases, the accuracy of LUT conversion improves. However, from a system construction perspective, the number of grid points of an LUT cannot be excessively increased because memory capacity, or the like, is limited. Therefore, it is desirable to improve the conversion accuracy of an LUT without changing the number of grid points.

[Present Technique]

The present technique will be described utilizing color conversion using the above-described 9×9×9 LUT and 17×17×17(=4913) LUT. In order to improve interpolation accuracy by using the 9×9×9 LUT, output values corresponding to 9×9×9 grid points must be modified. The output values of points 1 through 9 should be made to approach those in the 17×17×17 LUT by modifying the values of the grid points forming the 9×9×9 LUT.

Note that, for the sake of simplicity, only R'Dst9 of the output value (R'Dst9, G'Dst9, B'Dst9) of the 9×9×9 LUT will be described. The same process as R'DSt9 is performed for G'Dst9 and B'Dst9, and the description thereof will be omitted. The output values of points 1 through 9 using the 9×9×9 LUT are set to R'Dst9_1, R'Dst9_2, . . . , and R'Dst9_9, respectively. The output values of points 1 through 9 using the 17×17×17 LUT are set to R'Dst17_1, R'Dst17_2, . . . , and R'Dst17_9, respectively. Note that R'Dst9_5, . . . , and R'Dst9_9 are obtained using interpolation expressed by:

$$R'Dst9\_5 = (R'Dst9\_1 + R'Dst9\_2)/2$$

$$R'Dst9\_6 = (R'Dst9\_1 + R'Dst9\_3)/2$$

$$R'Dst9\_7 = (R'Dst9\_1 + R'Dst9\_2 + R'Dst9\_3 + R'Dst9\_4)/4$$

$$R'Dst9\_8 = (R'Dst9\_2 + R'Dst9\_4)/2$$

$$R'Dst9\_9 = (R'Dst9\_3 + R'Dst9\_4)/2$$

The values of grid points forming the 9×9×9 LUT are modified in order to make the output values of points 1 through 9 closer to those in the 17×17×17 LUT. More specifically, R'Dst9_1, R'Dst9_2, R'Dst9_3, and R'Dst9_4 are calculated so as to minimize each difference of points 1 through 9 between the two LUTs, and the output values of the grid points are modified. The above-described relationship is expressed in the following matrix. The relational expression is desirably derived using the same interpolation as in color conversion using the LUT when actually using the generated LUT.

$$\begin{pmatrix} 1 & 0 & 0 & 0 \\ 0.5 & 0.5 & 0 & 0 \\ 0 & 1 & 0 & 0 \\ 0.5 & 0 & 0.5 & 0 \\ 0 & 0 & 1 & 0 \\ 0 & 0.5 & 0 & 0.5 \\ 0 & 0 & 0 & 1 \\ 0 & 0 & 0.5 & 0.5 \\ 0.25 & 0.25 & 0.25 & 0.25 \end{pmatrix} \begin{pmatrix} R'Dst9\_1 \\ R'Dst9\_2 \\ R'Dst9\_3 \\ R'Dst9\_4 \end{pmatrix} = \begin{pmatrix} R'Dst17\_1 \\ R'Dst17\_5 \\ R'Dst17\_2 \\ R'Dst17\_6 \\ R'Dst17\_3 \\ R'Dst17\_8 \\ R'Dst17\_4 \\ R'Dst17\_9 \\ R'Dst17\_7 \end{pmatrix}$$

In order to obtain R'Dst9_1, R'Dst9_2, R'Dst9_3, and R'Dst9_4 which minimize the differences, a pseudo-inverse matrix of the left-hand side matrix is calculated by:

$$\begin{pmatrix} R'Dst9\_1 \\ R'Dst9\_2 \\ R'Dst9\_3 \\ R'Dst9\_4 \end{pmatrix} =$$

$$\begin{pmatrix} 0.694 & 0.278 & -0.139 & 0.278 & -0.139 & -0.056 & 0.028 & -0.056 & 0.111 \\ -0.139 & 0.278 & 0.694 & -0.056 & 0.028 & 0.278 & -0.139 & -0.056 & 0.111 \\ -0.139 & -0.056 & 0.028 & 0.278 & 0.694 & 0.694-0.056 & -0.139 & 0.278 & 0.111 \\ 0.028 & -0.056 & -0.139 & -0.056 & -0.139 & 0.278 & 0.694 & 0.278 & 0.111 \end{pmatrix}$$

$$\begin{pmatrix} R'Dst17\_1 \\ R'Dst17\_5 \\ R'Dst17\_2 \\ R'Dst17\_6 \\ R'Dst17\_3 \\ R'Dst17\_8 \\ R'Dst17\_4 \\ R'Dst17\_9 \\ R'Dst17\_7 \end{pmatrix}$$

When the output values of the LUT are replaced with R'Dst9_1, R'Dst9_2, R'Dst9_3, and R'Dst9_4 obtained by the above-described calculation, the differences between the output values of points 1 to 9 and those in the 17×17×17 LUT can be minimized.

To simplify the description, a given tetragon (cube) formed of grid points is considered, and the values of grid points which minimize the differences of the output values are determined based on the relationship among grid points forming the tetragon and those included in the tetragon. It is also possible to set a given grid point as a reference, and to determine the values of grid points which minimize the differences between the output values based on the relationship among grid points forming a plurality of tetragons (cubes) adjacent to the reference grid point and the points included in the tetragons. When the above-described relational expression is obtained and a pseudo-inverse matrix is to be calculated, it is possible to weight and calculate the grid points of the 9×9×9 LUT so as to further decrease output deviations of the grid points.

Note that the obtained R'Dst9_1, R'Dst9_2, R'Dst9_3, and R'Dst9_4 may result in values different from those of R'Dst17_1, R'Dst17_2, R'Dst17_3, and R'Dst17_4. Since the grid points are modified to minimize the differences, although accuracy in the vicinities of points 1 through 4 before modification is not substantially different from that of the output values in the 17×17×17 LUT, the accuracy may differ after modification. On the other hand, in the vicinities of points 5 through 9, when the differences are large before modification, they decrease after modification. In other words, even though the accuracy slightly decreases in the vicinities of points 1 through 4, the accuracy remarkably improves in the vicinities of points 5 through 9. Accordingly, the total color reproducibility remarkably improves. Only a region forming the LUT has been described. However, when the above-described process is applied to the whole region forming the LUT, the whole LUT can be modified.

First Embodiment

A procedure for generating and modifying an LUT according to the first embodiment will be described with reference to FIG. 11.

Figure 11:
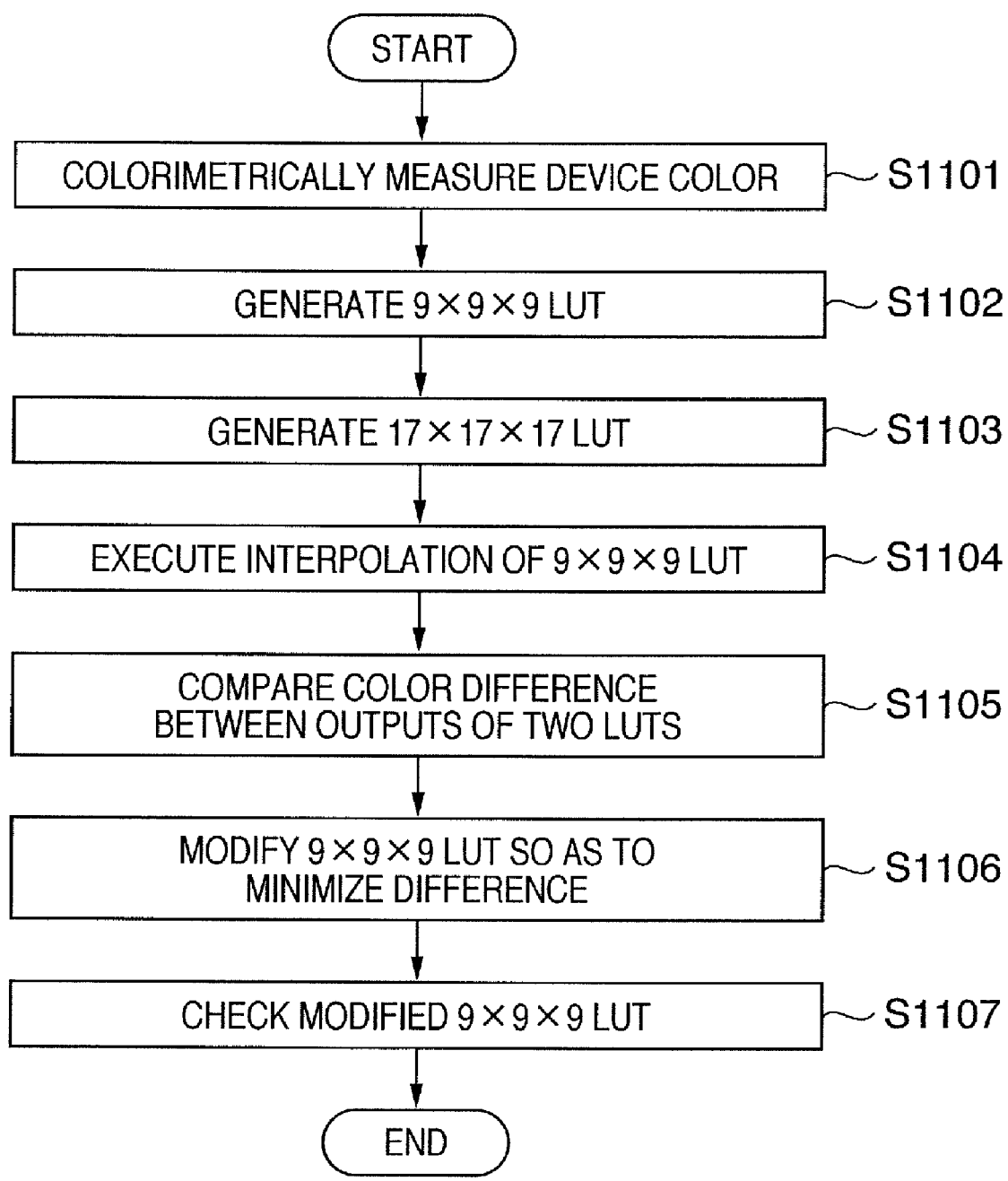
FIG. 11 is a flowchart illustrating the LUT generation and modification process according to the first embodiment.

FIG. 11 is a flowchart illustrating the LUT generation and modification process according to the first embodiment. First, patches of device colors are colorimetrically measured (S1101). A 9×9×9 LUT for color-converting sRGB to the device color is generated from the colorimetric values (device color→Lab relationship) obtained by the colorimetric measurement (S1102). A 17×17×17 LUT for color-converting sRGB to the device color is generated as in step S1102 (S1103). In this step, it is important that the 17×17×17 LUT includes the grid points of the 9×9×9 LUT and, in addition, output values corresponding to colors other than those of the grid points.

Output values corresponding to the colors of the grid points included in the 17×17×17 LUT are calculated from the 9×9×9 LUT by interpolation (S1104). The output values of the two LUTs are compared in order to find a gamut wherein the color difference is large (S1105). In this embodiment, simply the color difference between the output device colors may be used. Alternatively, the device color may be converted from the calorimetric value to Lab value, and the color difference in an Lab space may be used.

In order to decrease the portion wherein the color difference is large, only in the gamut wherein the color difference is large are the output values of the grid points forming the 9×9×9 LUT modified by the above-described method so as to minimize the difference between the two values (S1106). The result obtained by interpolation using the modified LUT is examined to check whether the color difference has significantly degraded (S1107). The output value in the portion wherein the color difference has degraded is returned to its unmodified value. With the above-described method, the color conversion accuracy of the LUT can be improved.

Note that when the 17×17×17 LUT is to be generated and modified, an LUT with a larger grid point count (e.g., 33×33×33 LUT) than the 17×17×17 LUT may be generated for comparison.

Although an LUT with a larger grid point count (e.g., 17×17×17 LUT) than the LUT to be generated is generated for comparison in this embodiment, it need not always be generated. For example, input values other than those of the grid points are set only for an important gamut (a gamut wherein the high accuracy of output values is required) of, for example, a skin color, the vicinity of the gray axis, or blue, and output values (device colors) corresponding to the input values may be calculated. The output values can be used in place of the above-described LUT with a large grid point count.

As a portion wherein a large deviation occurs, a portion wherein the distance between grid points is large or a portion wherein the linearity between a device color and an Lab value of its output value can be assumed to be low. Input values other than those of the grid points are set in advance for a portion wherein a large deviation presumably occurs, and output values (device colors) corresponding to the input values are calculated. Likewise, the obtained output values can be used in place of the above-described LUT with a large grid point count.

Second Embodiment

The second embodiment according to the present invention will be described in detail with reference to the accompanying drawings. In the first embodiment, interpolation of an LUT using cubic interpolation has been described as an example. Interpolation of an LUT is executed in various portions such as a driver, an application, a controller of an output device, or the like. An interpolation method of an LUT differs depending upon an operation module operated by each of the various portions. The method differs due to the required output accuracy, speed, memory limitations, and the like.

In an ICC profile, a color management module (CMM) in a color management system (CMS) executes color conversion such as interpolation of an LUT. The CMS and CMM are provided by a plurality of manufacturers, and a manufacturer who provides an LUT or a user can select a CMS and CMM. In addition, the kind of interpolation to be used also differs depending on the CMS and CMM to be used.

In order to correct an LUT, as described in the first embodiment, it is required to obtain a relational expression based on output values, and to modify the output values such that the relational expression provides a minimum difference. The relational expression is preferably derived by using the same interpolation method as in color conversion using the LUT when actually using the generated LUT.

According to the interpolation method used by the CMS and CMM to be used, it is required to obtain a relational expression by using the same interpolation method and to modify output values of grid points such that the difference becomes minimum.

A procedure for generating and changing an LUT according to the second embodiment will be described with reference to FIG. 12.

Figure 12:
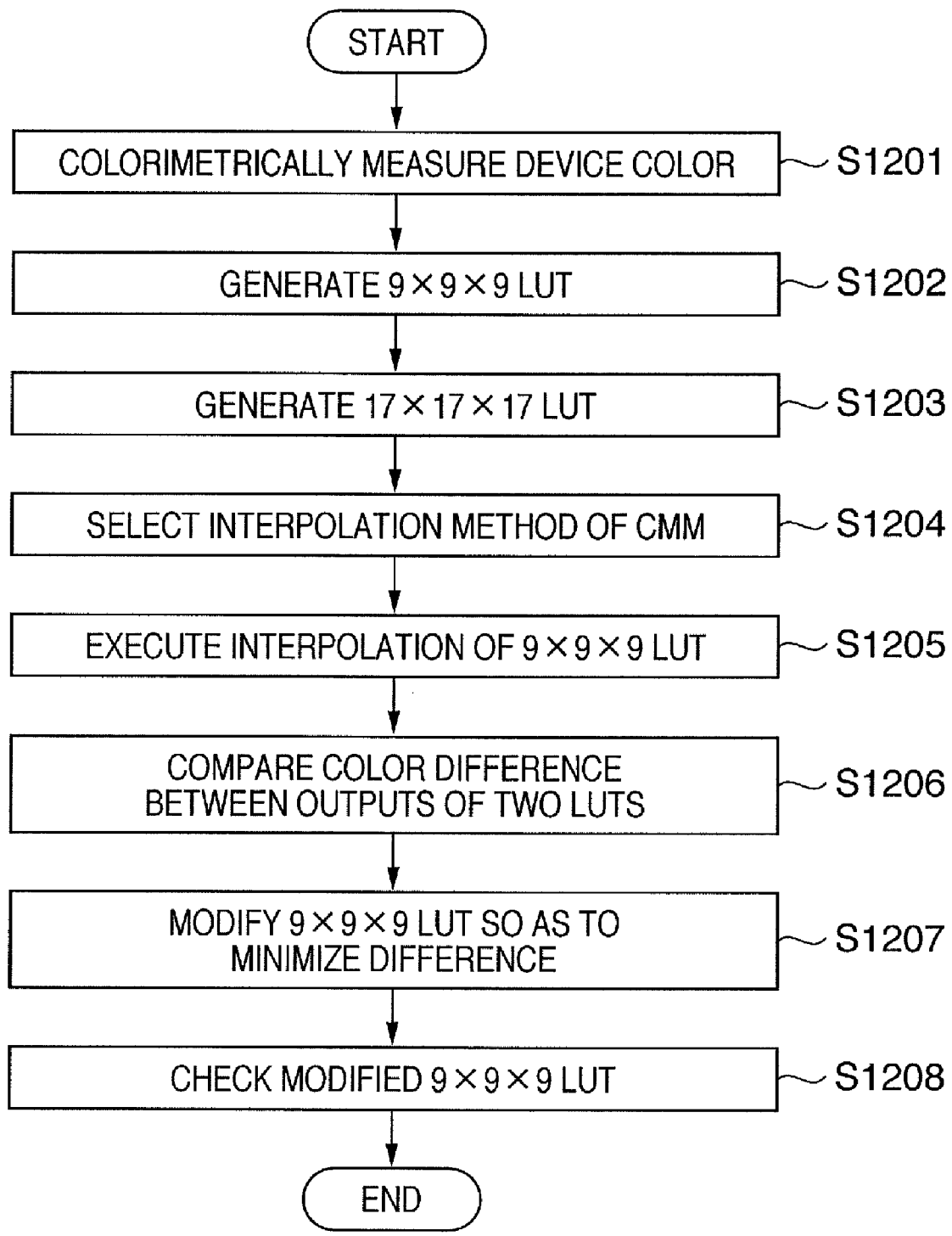
FIG. 12 is a flowchart illustrating the LUT generation and modification process according to the second embodiment.

FIG. 12 is a flowchart illustrating the LUT generation and modification process according to the second embodiment. First, patches of device colors are calorimetrically measured (S1201). A 9×9×9 LUT for color-converting sRGB to the device color is generated from the calorimetric values (device color→Lab relationship) obtained by the calorimetric measurement (S1202). A 17×17×17 LUT for color-converting sRGB to the device color is generated as in step S1202 (S1203). An interpolation method to be used when color conversion is actually executed using the LUT to be generated (S1204). Note that the interpolation method may be manually selected by the person generating the LUT, or may be automatically switched based on the CMM to be used or the like.

Figure 13:
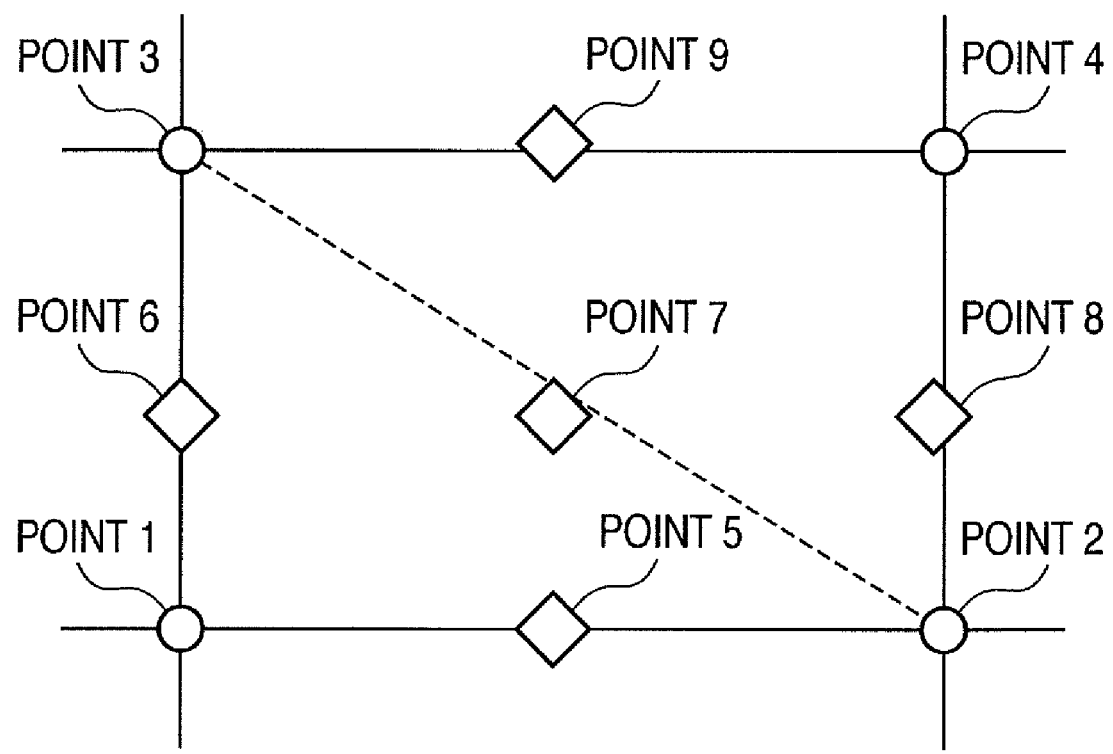
FIG. 13 is a view for explaining a case wherein the selected interpolation method is tetrahedron interpolation.

In this embodiment, the case wherein the selected interpolation method is tetrahedron interpolation will be described with reference to FIG. 13. Note that the outline of this embodiment is the same as in the first embodiment, and a description thereof will be omitted.

2D tetrahedron interpolation is expressed by a combination of triangles. In this embodiment, a triangle formed of points 1, 2, and 3 and a triangle formed of points 2 and 3, and point 4 shown in FIG. 13 are used. R'Dst9_5, . . . , and R'Dst9_7 can be obtained by interpolation expressed by:

$$R'Dst9\_5 = (R'Dst9\_1 + R'Dst9\_2)/2$$

$$R'Dst9\_6 = (R'Dst9\_1 + R'Dst9\_3)/2$$

$$R'Dst9\_7 = (R'Dst9\_2 + R'Dst9\_3)/2$$

That is, the values of the grid points forming the 9×9×9 LUT are modified so as to make the output values of points 1 to 9 closer to those of the 17×17×17 LUT. More specifically, R'Dst9_1, R'Dst9_2, and R'Dst9_3 are calculated so as to minimize the respective differences of points 1 to 9 between the two LUTs, and the output values of the grid points are modified. The above-described relationship is expressed by a matrix:

$$\begin{pmatrix} 1 & 0 & 0 \\ 0 & 1 & 0 \\ 0 & 0 & 1 \\ 0.5 & 0.5 & 0 \\ 0.5 & 0 & 0.5 \\ 0 & 0.5 & 0.5 \end{pmatrix} \begin{pmatrix} R'Dst9\_1 \\ R'Dst9\_2 \\ R'Dst9\_3 \end{pmatrix} = \begin{pmatrix} R'Dst17\_1 \\ R'Dst17\_2 \\ R'Dst17\_3 \\ R'Dst17\_5 \\ R'Dst17\_6 \\ R'Dst17\_7 \end{pmatrix}$$

In order to obtain R'Dst9_1, R'Dst9_2, and R'Dst9_3 which minimize the differences, a pseudo-inverse matrix of the left-hand side matrix is calculated.

Next, output values corresponding to the colors of the grid points included in the 17×17×17 LUT are calculated from the 9×9×9 LUT by interpolation (S1205). The output values of the two LUTs are compared to find a gamut wherein the color difference is large (S1206).

In order to decrease the portion wherein the color difference is large, only in the gamut wherein the color difference is large are the output values of the grid points forming the 9×9×9 LUT are modified by the above-described method so as to minimize the difference between the two values (S1207). The result obtained by interpolation using the modified LUT is examined to determine whether the color difference has significantly degraded (S1208). The output value in the portion wherein the color difference has degraded is returned to its unmodified value. With the above-described method, the color conversion accuracy of the LUT can be improved.

Modification 1

In the above-described first and second embodiments, a method has been described which corrects an LUT by using device colors corresponding to the colors of the grid points forming an estimated LUT and device colors corresponding to colors other than those of the grid points.

However, upon generating an LUT, not only an LUT of output device colors, but also the input colors of the grid points forming the LUT and gamut-compressed corresponding colors are generated during generating the LUT. These data can also be considered as output colors of the grid points forming the LUT.

An LUT can be corrected with respect to these intermediate output colors generated during the generation process, using the same method described in the first and second embodiments. When nonlinearity between an input and an intermediate output value is high, the correction effect is also high.

Third Embodiment

The third embodiment according to the present invention will be described in detail with reference to the accompanying drawing. In the first and second embodiments a method was described which uses the estimated grid point color values and other color values which support a given device which comprise an LUT in a technique to correct an LUT by minimizing its error through the use of a pseudo-inverse matrix.

The object of the present invention is to decrease deviations caused by interpolation of an LUT. One of the factors which cause a deviation stems from the fact that output values of colors other than those of the grid points of an LUT are not considered. As a method of correcting an LUT by using output device colors corresponding to the colors of grid points forming an estimated LUT and device colors corresponding to colors other than those of the grid points, smoothing can be executed to correct the LUT.

A procedure for generating and changing an LUT according to the third embodiment will be described with reference to FIG. 14.

FIG. 14 is a flowchart illustrating the LUT generation and modification process according to the third embodiment. First, patches of device colors are colorimetrically measured (S1401). A 9×9×9 LUT for color-converting sRGB to the device color is generated from the colorimetric values (device color→Lab relationship) obtained by the calorimetric measurement (S1402). A 17×17×17 LUT for color-converting sRGB to the device color is generated as in S1402 (S1403).

Output values corresponding to the colors of the grid points included in the 17×17×17 LUT are calculated from the 9×9×9 LUT by interpolation (S1404). The output values of the two LUTs are compared to find a gamut wherein the color difference is large (S1405).

In order to decrease the portion wherein the color difference is large, the output values of the grid points only in the gamut wherein the color difference is large are smoothed using the 17×17×17 LUT. The output values of the grid points of the 9×9×9 LUT are replaced by the obtained output values of the grid points (S1406). The result obtained by interpolation using the modified LUT is examined to determine whether the color difference has significantly degraded (S1407). The output value in the portion wherein the color difference has degraded is returned to its unmodified value. With the above-described method, the output values of the colors other than those of the grid points of the LUT are considered, and the color conversion accuracy of the LUT can be improved.

Modification 2

In the above-described first, second and third embodiments, a method has been described which generates an LUT with a large grid point count once, and corrects the desired LUT with a small grid point count, based on the generated LUT.

In color conversion using an LUT with a large grid point count, although the color conversion accuracy is high, the LUT size is large and LUT generation time is long. On the other hand, in color conversion using an LUT with a small grid point count, the color conversion accuracy is lower than that of an LUT with a large grid point count. However, the LUT size is small and generation time is short.

When an LUT is corrected using the method according to the first to third embodiments, compared to the uncorrected LUT, the color conversion accuracy of the LUT can become closer to that of an LUT with a large grid point count while keeping the LUT size small. However, the conversion accuracy cannot be matched completely, and the generation time is as long as that of an LUT with a large grid point count even though the accuracy is low in some parts.

Upon performing LUT correction according to the first to third embodiments, when only the important gamut of, for example, a skin color, vicinity of the gray axis, or blue is corrected, the LUT generation time can be shortened.

As has been described above, requirements as to all of color conversion accuracy, LUT size, and generation time cannot be met simultaneously due to the characteristics of the LUT. Different factors are important depending upon the environment wherein an LUT is generated and used. When a sufficient size for storing an LUT cannot be ensured, the LUT size must be small. When an LUT is to be generated for each color conversion, the LUT generation time must be short. When color conversion is executed and the print size is small or a print is used for a preview or trial, the color conversion accuracy need not be overly high.

When a sufficient size for storing an LUT cannot be ensured, an LUT obtained by the LUT correction according to the first, second and third embodiments, which has a small size and high conversion accuracy, is desirable.

When an LUT is to be generated for each color conversion, an LUT, the generation time of which is shortened by correcting only the important gamut of, for example, skin color, the vicinity of the gray axis, or blue, or an LUT with a small grid point count is desirable.

On the other hand, when there is no constraint, high conversion accuracy is of greatest import. In this case, since there is no constraint on the LUT size or generation time, an LUT with a large grid point count is desirable. It is also possible to use an LUT with a large grid point count upon generation and conversion, and to generate an LUT with a small grid point count by the LUT correction according to the first to third embodiments and store the generated LUT.

As described above, improved color conversion can be realized by switching the kind and generation method of an LUT based on the environment for generating and using the LUT.

Modification 3

In the above-described embodiments, a generation method of a first-stage LUT for color-converting a color space of an input device to a color space (second-stage RGB) of an output device has been described. However, the present invention can be used not only in a processing system wherein two (first-stage and second-stage) color conversions are executed but also in a generation method of an LUT for directly converting a color space of an input device to a color space (CMYK) of an output device.

Modification 4

In the above-described embodiments, a generation method of an LUT for converting from a color space of an input device to a color space (second-stage RGB or CMYK) of an output device has been described. However, the present invention can be also used in a generation method an LUT for converting from a device-independent color space (XYZ or Lab) used in color conversion using an ICC profile to a color space (second-stage RGB or CMYK) of an output device.

Modification 5

In the above-described embodiments, a case has been described wherein a series of processes are executed on the host computer 100. However, it is also possible to execute the series of processes on the printer 104 by adding the same functions as the host computer 100 to the printer 104.

For example, when the same functions as the host computer 100 are provided within the printer 104, a reading means such as a card reader provided to the printer 104 can read out image data from an image input device such as a digital camera via a memory card. Also, image data can be read out from a memory card or internal memory held by a digital camera by connecting the digital camera to the printer 104 using a wire cable, infrared communication, or wireless communication.

According to the above-described arrangements, the accuracy of an LUT can be improved without increasing the number of grid points of the LUT and without executing calorimetric measurement after the LUT is generated.

The present invention may be applied to a system constituted by a plurality of devices (e.g., host computer, interface device, reader, printer, and the like), or to an apparatus comprising a single device (e.g., copying machine, facsimile machine, or the like).

The object of the present invention is achieved even by supplying a storage medium storing software program codes for implementing the functions of the above-described embodiments to a system or an apparatus, and causing the computer (CPU or MPU) of the system or apparatus to read out and execute the program codes stored in the storage medium.

In this case, the program codes read out from the storage medium implement the functions of the above-described embodiments by themselves, and the storage medium storing the program codes constitutes the present invention.

As a storage medium for supplying the program codes, for example, a flexible disk, a hard disk, an optical disk, a magnetooptical disk, a CD-ROM, a CD-R, a magnetic tape, a nonvolatile memory card, a ROM, or the like can be used.

The functions of the above-described embodiments are implemented not only when the read out program codes are executed by the computer but also when the OS (Operating System) or the like running on the computer performs part or all of actual processing on the basis of the instructions of the program codes.

The functions of the above-described embodiments are also implemented when the program codes read out from the storage medium are written to the memory of a function expansion board inserted into the computer or a function expansion unit connected to the computer, and the CPU or the like of the function expansion board or function expansion unit performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-198706, filed Jul. 20, 2006, which is hereby incorporated by reference herein in its entirety.

What is claimed is:

1. A color conversion table generation method comprising:
generating a first color conversion table by estimating device colors corresponding to colors of grid points of the first color conversion table from colorimetric values obtained by colorimetrically measuring colors of a gamut reproduced by an output device;
generating a second color conversion table in which the number of grid points is more than the number of the grid points of the first color conversion table by estimating device colors corresponding to colors of the grid points of the second color conversion table from the colorimetric values obtained by colorimetrically measuring the colors of the gamut reproduced by the output device;
interpolating the colors between the grid points of the first color conversion table to obtain interpolated colors corresponding to the colors of the grid points which are included in the second color conversion table and are not included in the first color conversion table; and
correcting the first color conversion table by changing the colors of the grid points of the first color conversion table such that the interpolated colors approach to the colors of the grid points included in the second color conversion table.

2. The method according to claim 1, wherein correction is effected by minimizing a difference for each color between the interpolated colors and the colors of the grid points included in the second color conversion table.

3. The method according to claim 2, wherein in the correcting step, the interpolated colors are compared with the colors of the grid points included in the second color conversion table and the first color conversion table is corrected to minimize a difference for each color in which a color difference of a comparison result is large.

4. The method according to claim 1, wherein a pseudo-inverse matrix is used for correcting.

5. The method according to claim 1, wherein an interpolation operation used in the interpolating step is selected from a plurality of interpolation operations on the basis of the inter- polation operation used for color conversion using the first color conversion table.

6. A color conversion table generated by a color conversion table generation method according to claim 1.

7. A program stored in a computer-readable storage medium and causing a computer to execute a color conversion table generation method according to claim 1.

8. A color conversion table generation method comprising:
generating a first color conversion table by estimating device colors corresponding to colors of grid points of the first color conversion table from colorimetric values obtained by colorimetrically measuring colors of a gamut reproduced by an output device;
generating a second color conversion table in which the number of grid points is more than the number of the grid points of the first color conversion table by estimating device colors corresponding to colors of the grid points of the second color conversion table from the colorimetric values obtained by colorimetrically measuring the colors of the gamut reproduced by the output device;
interpolating the colors between the grid points of the first color conversion table to obtain interpolated colors corresponding to the colors of the grid points which are included in the second color conversion table and are not included in the first color conversion table;
comparing the first color conversion table with the second color conversion table to obtain a gamut wherein the color difference is large; and
correcting the first color conversion table by smoothing the colors of the grid points included in the second color conversion table corresponding to the obtained gamut to use the smoothed colors.

9. A color conversion table generated by a color conversion table generation method according to claim 8.

10. A program stored in a computer-readable storage medium and causing a computer to execute a color conversion table generation method according to claim 8.

11. A color conversion table generation device comprising:
a first generation unit constructed to generate a first color conversion table by estimating device colors corresponding to colors of grid points of the first color conversion table from colorimetric values obtained by colorimetrically measuring colors of a gamut reproduced by an output device;
a second generation unit constructed to generate a second color conversion table in which the number of grid points is more than the number of the grid points of the first color conversion table by estimating device colors corresponding to colors of the grid points of the second color conversion table from the colorimetric values obtained by calorimetrically measuring the colors of the gamut reproduced by the output device;
an interpolation unit constructed to interpolate the colors between the grid points of the first color conversion table to obtain interpolated colors corresponding to the colors of the grid points which are included in the second color conversion table and are not included in the first color conversion table; and
a correction unit constructed to correct the first color conversion table by changing the colors of the grid points of the first color conversion table such that the interpolated colors approach to the colors of the grid points included in the second color conversion table.

12. A color conversion table generation device comprising:
a first generation unit constructed to generate a first color conversion table by estimating device colors corresponding to colors of grid points of the first color conversion table from colorimetric values obtained by colorimetrically measuring colors of a gamut reproduced by an output device;

a second generation unit constructed to generate a second color conversion table in which the number of grid points is more than the number of the grid points of the first color conversion table by estimating device colors corresponding to colors of the grid points of the second color conversion table from the colorimetric values obtained by colorimetrically measuring the colors of the gamut reproduced by the output device;

an interpolation unit constructed to interpolate the colors between the grid points of the first color conversion table to obtain interpolated colors corresponding to the colors of the grid points which are included in the second color conversion table and are not included in the first color conversion table;

a comparison unit constructed to compare the first color conversion table with the second color conversion table to obtain a gamut wherein the color difference is large; and a correction unit constructed to correct the first color conversion table by smoothing the colors of the grid points included in the second color conversion table corresponding to the obtained gamut to use the smoothed colors.

* * * * *